(No Model.)

W. L. ALEXANDER.
CORN PLANTER.

No. 263,453. Patented Aug. 29, 1882.

WITNESSES:
Fred. G. Dieterich
Jno. A. Madigan

INVENTOR.
William L. Alexander,
by Louis Bagger & Co.
ATTORNEYS.

UNITED STATES PATENT OFFICE.

WILLIAM L. ALEXANDER, OF CISCO, ILLINOIS.

CORN-PLANTER.

SPECIFICATION forming part of Letters Patent No. 263,453, dated August 29, 1882.

Application filed May 26, 1882. (No model.)

*To all whom it may concern:*

Be it known that I, WILLIAM L. ALEXANDER, of Cisco, in the county of Piatt and State of Illinois, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification, and in which—

Figure 1:
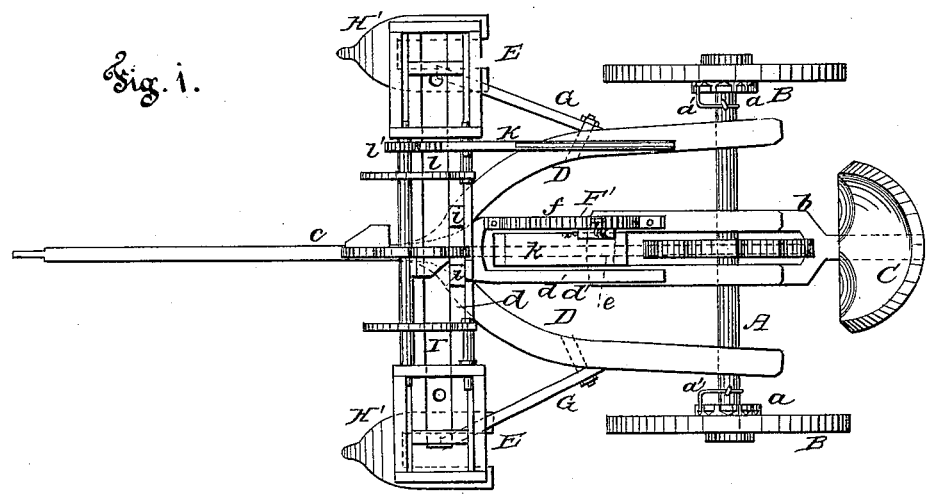
Figure 2:
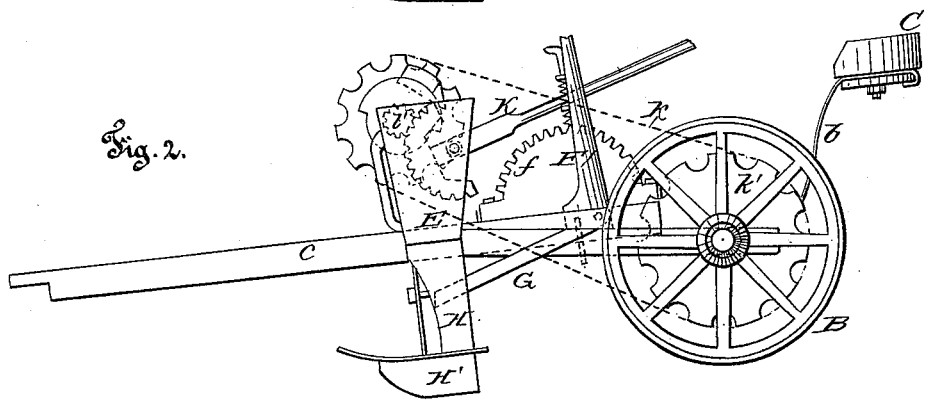
Figure 3:
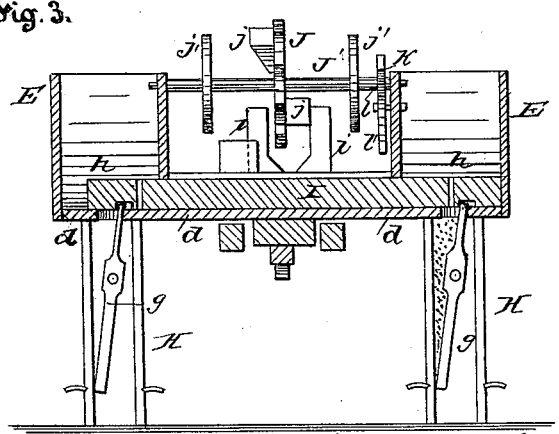

Figure 1 is a plan view of my improved corn-planter. Fig. 2 is a side elevation, and Fig. 3 is a transverse vertical section, thereof.

This invention appertains to improvements in corn-planters; and it consists in the combination and arrangement of parts, substantially as hereinafter more fully set forth and claimed.

In carrying out my invention I employ, as will be observed by reference to the accompanying drawings, an axle, A, having the wheels B B, and adapted to turn with the wheels, when the machine is moving forward, by means of the pinions or ratchets $a$, affixed to the wheels, and the pawls $a'$, connected to the axle. As the machine is moved backward or being turned the pawls will ride over the ratchets, and thus prevent the turning of the axle or shaft which operates the seed-slide to avoid the dropping of the seed on those occasions. Upon this axle is suitably mounted by a strong spring, $b$, the driver's seat C.

D is a bifurcated frame, through which passes the shaft or axle A, pivoted to the inner end of the tongue $c$, connected in the usual manner to the supporting-bar $d$ of the seed-boxes E, one disposed upon each end thereof. The rear end of the tongue, forward of which the frame D is pivoted, is also bifurcated, as at $d'$, and rests above the frame D upon a cross-bar, $e$, passed through and affixed to the lower end of a lever, F, pivoted in the frame D, and having a spring-pawl to engage with the segmental rack $f$, fastened to or formed with one of the prongs of the bifurcated part of the tongue. The aforesaid arrangement permits the adjustment of the tongue, upon which, as before stated, the seed-box support $d$, also carrying the plows and their standards, is secured, so as to present the plows at the desired angle to the ground or lift their points out of the ground, as may be desired. The axle A is further connected to the tongue $c$ by the usual hounds, G.

To the lower sides of the apertured ends of the seed-box support $d$ are secured, directly in line with said apertures and seed-boxes, the hollow standards H, having the plows H'. Within each standard H is pivoted a vibratory valve, $g$, projecting through the apertures in the bar $d$, and operated by the seed-slide to effect the dropping of the seed in hills.

I is the seed-slide, moving on the bar $d$ and having its apertured ends arranged in the seed-boxes $h$. This bar or slide I has two upright projections, $i$, upon it, which are alternately struck by cams $j$, arranged upon opposite sides of and at distant points upon the toothed wheel or pinion J, secured on a shaft, J', having its bearings in the inner sides of the seed-boxes $h$. Upon this shaft may be arranged cams $j'$, to take the place of the cams on the pinion, with other devices arranged on the seed-slide in a manner to operate it. This pinion receives motion through an endless chain or belt, $k$, encompassing it, and a pinion, $k'$, on the driving-wheel shaft or axle A; or it may be operated by a hand-lever, K, reaching back to the operator in the seat C, pivoted to the side of one seed-box, and having a segmental rack, $l$, engaging a pinion, $l'$, upon the shaft of the pinion J.

This planter does its work efficiently and without the use of the check-row line, and is readily operated either by boy or man.

I claim and desire to secure by Letters Patent of the United States—

The combination of the driving shaft or axle and its wheels, the pinion arranged thereon, the bifurcated frame, the bifurcated tongue, the lever having a cross-bar, upon which the rear end of the tongue rests, and pivoted to the said frame, the bar $d$, having the seed-boxes and their slide provided with upright projections, the shaft J', having the cam-pinion J $j$, and the belt encompassing the driving-shaft pinion and the pinion J, substantially as and for the purpose set forth.

In testimony that I claim the foregoing as my own I have hereunto affixed my signature in presence of two witnesses.

WILLIAM L. ALEXANDER.

Witnesses:
WILL B. DAVIS,
RICHARD MOONEY.